United States Patent
Seo et al.

(10) Patent No.: US 10,906,420 B2
(45) Date of Patent: Feb. 2, 2021

(54) VEHICLE CHARGING CONTROL APPARATUS AND METHOD, AND VEHICLE CHARGING SYSTEM

(71) Applicants: HYUNDAI MOTOR COMPANY, Seoul (KR); KIA MOTORS CORPORATION, Seoul (KR)

(72) Inventors: Gil Won Seo, Hwaseong-si (KR); Jong Ho Park, Incheon (KR); Dae Joong Yoon, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/838,552

(22) Filed: Apr. 2, 2020

(65) Prior Publication Data
US 2020/0231055 A1 Jul. 23, 2020

Related U.S. Application Data

(62) Division of application No. 15/918,053, filed on Mar. 12, 2018, now Pat. No. 10,647,216.

(30) Foreign Application Priority Data

Nov. 2, 2017 (KR) .......................... 10-2017-0145551

(51) Int. Cl.
*B60L 53/36* (2019.01)
*G05D 1/00* (2006.01)
(Continued)

(52) U.S. Cl.
CPC ............... *B60L 53/36* (2019.02); *B60L 53/12* (2019.02); *B60L 58/12* (2019.02); *G05D 1/0016* (2013.01); *G05D 1/0225* (2013.01); *G08G 1/14* (2013.01)

(58) Field of Classification Search
CPC .......... B60L 53/36; B60L 53/12; B60L 58/12; B60L 11/1809; B60L 11/182; G08G 1/14;
(Continued)

(56) References Cited

U.S. PATENT DOCUMENTS 6,181,991 B1 * 1/2001 Kondo ................... B60L 53/305
701/22
6,185,487 B1 * 2/2001 Kondo ................ G07F 17/0014
701/22
(Continued)

FOREIGN PATENT DOCUMENTS

KR 10-1704237 B1 2/2017

*Primary Examiner* — Muhammad Shafi
(74) *Attorney, Agent, or Firm* — Morgan, Lewis & Bockius LLP

(57) ABSTRACT

A vehicle charging control apparatus includes: a communicator transmitting and receiving a signal to and from a parking lot control system, which is in a parking lot including charging slots and non-charging slots, and a user terminal; a remote parking controller activating an automatic moving and parking function of a vehicle according to the signal received from the user terminal when the vehicle is in a non-charging slot of the parking lot, receiving charging slot information from the parking lot control system when a charging slot among the charging slots is empty, and controlling the vehicle to move and park based on the empty charging slot; and a charging controller controlling wireless charging of the vehicle when the vehicle moves to park in the charging slot.

11 Claims, 19 Drawing Sheets

(51) Int. Cl.
*G05D 1/02* (2020.01)
*B60L 53/12* (2019.01)
*B60L 58/12* (2019.01)
*G08G 1/14* (2006.01)

(58) Field of Classification Search
CPC ...... G08G 1/144; G08G 1/146; G05D 1/0016; G05D 1/0225; B60W 30/06
USPC .......................................................... 701/2
See application file for complete search history.

(56) References Cited

U.S. PATENT DOCUMENTS

| | | | |
|---|---|---|---|
| 6,618,650 B1 * | 9/2003 | Nakai | G07F 17/0042 |
| | | | 701/1 |
| 9,592,742 B1 * | 3/2017 | Sosinov | G05D 1/0225 |
| 9,696,720 B2 | 7/2017 | Seo et al. | |
| 2004/0073440 A1 * | 4/2004 | Garbers | G06Q 10/02 |
| | | | 705/5 |
| 2010/0094496 A1 * | 4/2010 | Hershkovitz | B60L 3/12 |
| | | | 701/22 |
| 2014/0217966 A1 * | 8/2014 | Schneider | H02J 7/025 |
| | | | 320/108 |
| 2015/0149221 A1 * | 5/2015 | Tremblay | B60L 11/1846 |
| | | | 705/5 |
| 2016/0372771 A1 * | 12/2016 | Smith | H01M 2/022 |
| 2017/0021828 A1 | 1/2017 | Seo et al. | |

\* cited by examiner

VEHICLE CHARGING CONTROL APPARATUS AND METHOD, AND VEHICLE CHARGING SYSTEM

CROSS-REFERENCE TO RELATED APPLICATION

This application is a divisional application of U.S. patent application Ser. No. 15/918,053, filed on Mar. 12, 2018, which is based on and claims the benefit of priority to Korean Patent Application No. 10-2017-0145551, filed on Nov. 2, 2017, in the Korean Intellectual Property Office, the disclosures of which are incorporated herein in their entirety by reference.

TECHNICAL FIELD

The present disclosure relates to a vehicle charging control apparatus and method, and a vehicle charging system.

BACKGROUND

Chargers for charging electric vehicles are roughly classified into a quick charger and a standard charger depending on a charging capacity and a charging speed. A charging infrastructure including such chargers may be provided with wired chargers, but a charging infrastructure with wireless chargers is expected to be gradually introduced.

It takes a predetermined amount of time to charge a vehicle parked in a parking lot having a charging infrastructure. Thus, a user often parks the vehicle and moves to another place to wait while charging the vehicle.

In this case, if the user leaves the vehicle parked even after the charging of the vehicle is completed, another vehicle entering the parking lot for charging should wait until the charged vehicle is moved, or should find another charging infrastructure.

SUMMARY

The present disclosure has been made to solve the above-mentioned problems occurring in the prior art while advantages achieved by the prior art are maintained intact.

An aspect of the present disclosure provides a vehicle charging control apparatus and method, and a vehicle charging system, enabling automatic moving and parking of a vehicle by a remote smart parking assist (RSPA) system when the charging of the vehicle parked in a charging slot of a parking lot is completed.

Another aspect of the present disclosure provides a vehicle charging control apparatus and method, and a vehicle charging system, enabling automatic moving and parking of a vehicle by an RSPA system when an empty charging slot is detected while the vehicle is waiting in a non-charging slot of a parking lot.

Another aspect of the present disclosure provides a vehicle charging control apparatus and method, and a vehicle charging system, which are configured to provide information on the state of charge or the moving and parking state of a vehicle parked in a charging slot or a non-charging slot of a parking lot through a remote user terminal.

According to an exemplary embodiment of the present disclosure, a vehicle charging control apparatus may include: a communicator transmitting and receiving a signal to and from a parking lot control system, which is in a parking lot including charging slots and non-charging slots, and a user terminal; a remote parking controller activating an automatic moving and parking function of a vehicle according to the signal received from the user terminal when the vehicle is in a non-charging slot of the parking lot, receiving charging slot information from the parking lot control system when a charging slot among the charging slots is empty, and controlling the vehicle to move and park based on the empty charging slot; and a charging controller controlling wireless charging of the vehicle when the vehicle moves to park in the charging slot.

The remote parking controller may identify a priority of the vehicle that is assigned by the parking lot control system when the vehicle is waiting in the non-charging slot, and enter a standby mode.

The remote parking controller may wake up from the standby mode when a request signal for requesting the vehicle to be ready to move and park is received from the parking lot control system, and generate a traveling route based on the charging slot information received from the parking lot control system.

The remote parking controller may control the vehicle to move and park in the charging slot when it is confirmed by the parking lot control system that the charging slot is open.

The charging controller may transmit charging start information to the user terminal.

According to another exemplary embodiment of the present disclosure, a vehicle charging control apparatus may include: a communicator transmitting and receiving a signal to and from a parking lot control system in a parking lot including charging slots and non-charging slots and a user terminal; a charging controller controlling wireless charging of a vehicle when the vehicle is parked in a charging slot of the parking lot; and a remote parking controller activating an automatic moving and parking function of the vehicle based on a signal received from the user terminal, receiving parking space information from the parking lot control system when the wireless charging of the vehicle is completed, and controlling the vehicle to move and park based on the parking space.

The remote parking controller may transmit information that the vehicle is allowed to move and park to the parking lot control system when the wireless charging of the vehicle is completed.

The remote parking controller may include: a position recognition module recognizing a location of the parking space; a route generation module generating a traveling route to the parking space as a destination; a parking trajectory generation module generating a parking trajectory based on the parking space; and a parking control module controlling parking of the vehicle based on the generated parking trajectory.

The parking space information may include information on a location of an empty non-charging slot.

The parking space information may include information on a location of a waiting parking space around a waiting vehicle having the highest priority.

The remote parking controller may receive information on a location of an empty non-charging slot from the parking lot control system when the vehicle has been parked in the waiting parking space, and control the vehicle to move and park based on the received information on the location of the empty non-charging slot.

The remote parking controller may transmit parking completion information to the user terminal when the vehicle is moved and parked.

According to an exemplary embodiment of the present disclosure, a vehicle charging control method may include: activating an automatic moving and parking function of a vehicle based on a signal received from a user terminal when the vehicle is waiting in a non-charging slot in a parking lot including charging slots and non-charging slots; receiving charging slot information from a parking lot control system when a charging slot among the charging slots is empty, and controlling the vehicle to move and park based on the empty charging slot; and controlling wireless charging of the vehicle when the vehicle moves to park in the charging slot.

The vehicle charging control method may further include: identifying a priority of the vehicle that is assigned by the parking lot control system when the vehicle is waiting in the non-charging slot, and entering a standby mode; waking up from the standby mode when a request signal for requesting the vehicle to be ready to move and park is received from the parking lot control system; and generating a traveling route based on the charging slot information received from the parking lot control system.

The vehicle may be controlled to move and park based on the generated traveling route when it is confirmed by the parking lot control system that the charging slot is open.

The vehicle charging control method may further include transmitting charging start information to the user terminal when the wireless charging of the vehicle is started.

According to another aspect of the present disclosure, a vehicle charging control method may include: controlling wireless charging of a vehicle when the vehicle has been parked in a charging slot of a parking lot; activating an automatic moving and parking function of the vehicle based on a signal received from a user terminal; and receiving parking space information from a parking lot control system when the wireless charging of the vehicle is completed, and controlling the vehicle to move and park based on the parking space.

The controlling of the vehicle may include: receiving information on a location of a waiting parking space around a waiting vehicle having the highest priority from the parking lot control system; controlling the vehicle to move and park based on the information on the location of the waiting parking space; and controlling the vehicle to move and park based on information on a location of a non-charging slot received from the parking lot control system when the vehicle has been parked in the waiting parking space.

The vehicle charging control method may further include transmitting parking completion information to the user terminal when the vehicle has been moved and parked in the non-charging slot.

According to an aspect of the present disclosure, a vehicle charging system may include: a parking lot control system installed in a parking lot including charging slots and non-charging slots, and controlling a charging vehicle parked in a charging slot or a waiting vehicle parked in a non-charging slot to move and park; at least one vehicle charging control apparatus activating an automatic moving and parking function of the vehicle parked in the charging slot or the non-charging slot, controlling the vehicle to move and park based on charging slot information received from the parking lot control system when an empty charging slot is detected while the vehicle is waiting in the non-charging slot of the parking lot, controlling wireless charging of the vehicle, and controlling the vehicle to move and park based on parking space information received from the parking lot control system when the wireless charging of the vehicle is completed; and a user terminal communicating with the charging control apparatus and providing information on a state of charge or a moving and parking state of the vehicle.

The parking lot control system may transmit the parking space information to the charging control apparatus of a first vehicle when it is confirmed that the first vehicle parked in the charging slot is allowed to move and park, and transmit the charging slot information to the charging control apparatus of a second vehicle waiting in the non-charging slot when it is confirmed that the charging slot is open.

The parking lot control system may assign priorities to vehicles waiting in the non-charging slots in order of entry into the parking lot, and request the charging control apparatus of a vehicle having a high priority to control moving and parking of the corresponding vehicle according to the assigned priorities when an empty charging slot is detected.

When charging of at least two or more vehicles parked in the charging slots is completed simultaneously, the parking lot control system may prioritize a vehicle which first starts charging in order of charging start time, and request the charging control apparatus of the corresponding vehicle to control moving and parking of the corresponding vehicle.

When charging of at least two or more vehicles parked in the charging slots is completed simultaneously, the parking lot control system may prioritize a first vehicle which has been slowly charged over a second vehicle which has been quickly charged, and request the charging control apparatus of the first vehicle to control moving and parking of the first vehicle.

The parking lot control system may control the second vehicle to move and park in an empty standard charging slot after the first vehicle has been moved and parked in an empty non-charging slot, and the charging control apparatus of the second vehicle may move the second vehicle to park in the standard charging slot according to the controlling of the parking lot control system.

The parking lot control system may control a first vehicle parked in a quick charging slot to move and park in an empty non-charging slot when the charging of the first vehicle is completed, and control one of vehicles parked in standard charging slots to move and park in the empty quick charging slot according to states of charge of the vehicles parked in the standard charging slots.

The parking lot control system may determine which vehicle of the vehicles parked in the standard charging slots is to be moved and parked into the quick charging slot based on at least one of priority of entry into the standard charging slots, charge amount, and remaining charging time.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
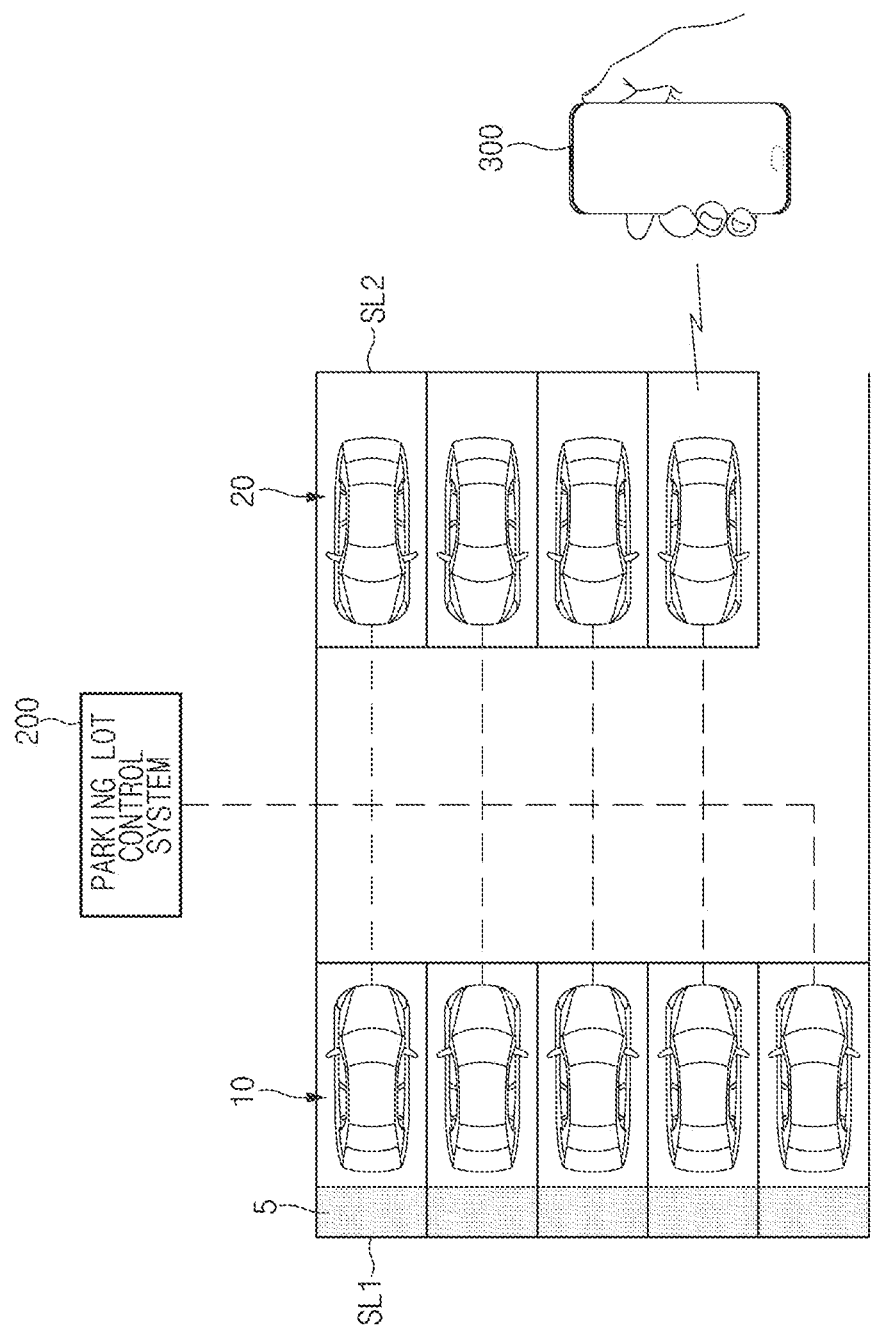
FIG. 1 illustrates a vehicle charging system, according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 illustrates a vehicle charging system, according to an exemplary embodiment of the present disclosure.

Referring to FIG. 1, a vehicle charging system may include a vehicle charging control apparatus 100 (see FIG. 2) provided in a charging vehicle 10 parked in a charging slot SL1 and/or a waiting vehicle 20 parked in a non-charging slot SL2 in a parking lot, a parking lot control system 200 installed in the parking lot, and a user terminal 300 communicating with the charging control apparatus 100 of each vehicle. Here, each charging slot SL1 may be provided with a wireless charger (not shown) that wirelessly supplies charging power to the charging vehicle 10 parked in the corresponding slot. The charging slot SL1 may be indicated charging state of the charging vehicle 10 in one area 5. The non-charging slot SL2 refers to a space which is not provided with a separate charger, wherein the space may be used as a parking space in which the waiting vehicle 20 to be charged is temporarily parked, or to which the charged vehicle is to be moved.

The vehicle charging control apparatus 100 may communicate with the parking lot control system 200 and the user terminal 300 to transmit and receive signals.

In addition, the vehicle charging control apparatus 100 may activate an automatic moving and parking function of the vehicle parked in the charging slot SL1 or the non-charging slot SL2, and control remote parking of the activated vehicle.

Here, when an empty charging slot is detected while the vehicle is waiting in the non-charging slot SL2 of the parking lot, the vehicle charging control apparatus 100 may move the vehicle to park in the charging slot on the basis of charging slot information received from the parking lot control system 200, and control wireless charging of the vehicle parked in the charging slot SL1.

In addition, when the wireless charging of the vehicle parked in the charging slot SL1 is completed, the vehicle charging control apparatus 100 may control the charged vehicle to move and park on the basis of parking space information received from the parking lot control system 200.

The configuration of the vehicle charging control apparatus 100 will be described in more detail with reference to FIG. 2.

The vehicle charging control apparatus 100, according to an exemplary embodiment of the present disclosure, may be provided in the interior of the vehicle. Here, the vehicle charging control apparatus 100 may be formed integrally with internal control units, such as an electronic control unit (ECU), of the vehicle, or may be configured as a separate apparatus that may be connected to the control units of the vehicle through separate connectors.

The parking lot control system 200 may be installed in a parking lot including charging slots SL1 and non-charging slots SL2, and control the moving and parking of the charging vehicle 10 parked in the charging slot SL1 and/or the moving and parking of the waiting vehicle 20 parked in the non-charging slot SL2.

When a plurality of vehicles are waiting in the non-charging slots, the parking lot control system 200 may assign priorities to the plurality of waiting vehicles 20 in order of entry into the parking lot, and guide a waiting vehicle having a higher priority into an empty charging slot according to the assigned priorities.

In addition, when wireless charging of the charging vehicle 10 parked in the charging slot SL1 is completed, the parking lot control system 200 may identify the location of a parking space to which the charging vehicle 10 is to be moved, and transmit the identified parking space information to the charging control apparatus 100 of the charging vehicle 10. Thus, the charging control apparatus 100 of the charging vehicle 10 may move and park the vehicle on the basis of the parking space information received from the parking lot control system 200.

Here, when there is an empty non-charging slot nearby, the parking lot control system 200 may provide information on the location of the empty non-charging slot to the charging control apparatus 100 of the charging vehicle 10.

On the other hand, when there is no empty non-charging slot nearby, the parking lot control system 200 may provide information on the location of a waiting parking space around the waiting vehicle 20 having a high priority to the charging control apparatus 100 of the charging vehicle 10. In this case, when the vehicle 10 has been moved and parked in the waiting parking space and the vehicle 20 having a high priority has been moved and parked in the charging slot SL1, the parking lot control system 200 may transmit information on the location of an empty non-charging slot to the charging control apparatus 100 of the vehicle 10 parked in the waiting parking space to guide the vehicle 10 into the empty non-charging slot. An embodiment thereof will be described with reference to FIGS. 5A through 5E.

In addition, when the charging of at least two vehicles among a plurality of vehicles being charged is completed simultaneously, the parking lot control system 200 may prioritize the charged vehicles in order of charging start time to control the moving and parking thereof. An embodiment thereof will be described with reference to FIGS. 7A through 7C.

In addition, when a vehicle parked in a standard charging slot and a vehicle parked in a quick charging slot have been charged simultaneously, the parking lot control system 200 may prioritize the vehicle parked in the standard charging slot over the vehicle parked in the quick charging slot to control the moving and parking thereof. In this case, the vehicle parked in the quick charging slot may not be charged to 100% due to safety issues and the like. Thus, the parking lot control system 200 may control the vehicle charged in the quick charging slot to move and park in the standard charging slot, thereby allowing the vehicle to be charged to 100%. An embodiment thereof will be described with reference to FIGS. 8A through 8C.

In addition, when the charging of a vehicle parked in a quick charging slot among a plurality of vehicles being charged is completed, the parking lot control system 200 may control the charged vehicle to move and park in an empty non-charging slot, and then control another vehicle to move and park in the quick charging slot according to the states of charge of the vehicles being charged. An embodiment thereof will be described with reference to FIGS. 9A and 9B.

The user terminal 300 may communicate with the vehicle charging control apparatus 100 to activate an automatic moving and parking function of the vehicle according to the user's request. In addition, the user terminal 300 may receive information on the state of charge and the moving and parking state of the vehicle from the vehicle charging control apparatus 100, and output the received information on a display screen.

Detailed operations of the vehicle charging system according to exemplary embodiments will be described with reference to FIGS. 3 through 9B.

Figure 2:
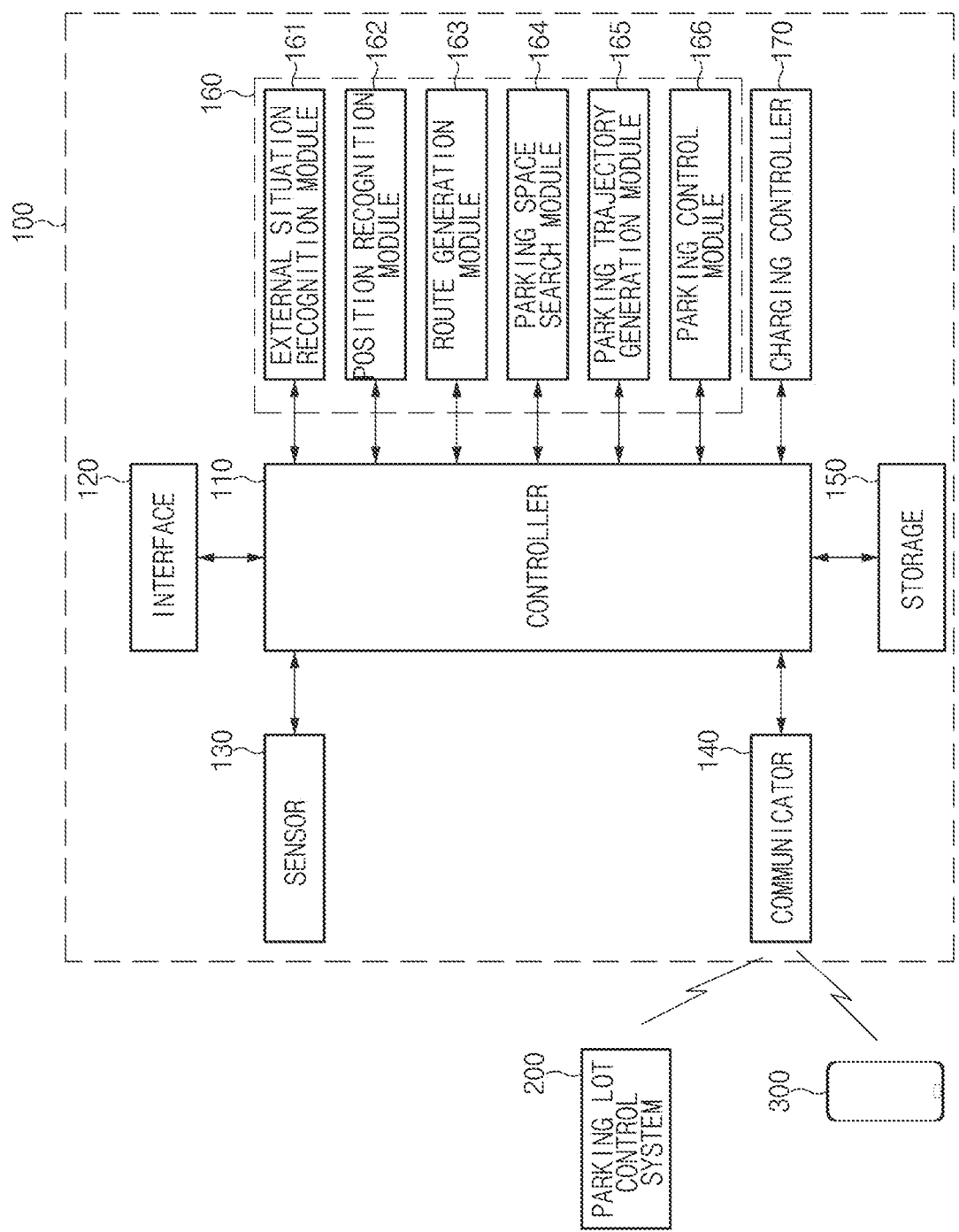
FIG. 2 illustrates the configuration of a vehicle charging control apparatus, according to an exemplary embodiment of the present disclosure.

FIG. 2 illustrates the configuration of a vehicle charging control apparatus, according to an exemplary embodiment of the present disclosure.

Referring to FIG. 2, the vehicle charging control apparatus 100 may include a controller 110, an interface 120, a sensor 130, a communicator 140, a storage 150, a remote parking controller 160, and a charging controller 170. Here, the controller 110 may process signals received and transmitted between the above-mentioned elements of the vehicle charging control apparatus 100.

The interface 120 may include an input unit (not shown) for receiving a control command from a user, and an output unit (not shown) for outputting the operation state, result, and the like of the vehicle charging control apparatus 100.

Here, the input unit may include key buttons, and may also include a mouse, a joystick, a jog shuttle, a stylus pen, and the like. In addition, the input unit may also include soft keys on display.

The output unit may include a display unit, and may also include an audio output unit such as a speaker. When a touch sensor, such as a touch film, a touch sheet, or a touch pad, is provided on the display unit, the display unit may operate as a touch screen, and the input unit and the output unit may be integrated.

Here, the display unit may include at least one of liquid crystal display (LCD), thin film transistor-liquid crystal display (TFT LCD), organic light emitting diode (OLED), flexible display, field emission display (FED), and 3D display.

The sensor 130 may include at least one sensor detecting information on the surroundings of the vehicle. For example, the sensor 130 may include at least one of a camera, a radio detection and ranging (RADAR) sensor, a light detection and ranging (LiDAR) sensor, and an ultrasonic sensor. Here, the sensor 130 may detect the position of an obstacle around the vehicle and/or the location of an empty parking space.

In addition, the sensor 130 may include at least one sensor detecting information on the driving state of the vehicle. For example, the sensor 130 may include an acceleration sensor and/or a yaw rate sensor.

The communicator 140 may include a communication module that supports a communication interface with electric/electronic elements and control units provided in the vehicle. Here, the communication module may include a module supporting vehicle network communications, such as controller area network (CAN) communication, local interconnect network (LIN) communication, and Flex-Ray communication.

For example, the communicator 140 may be connected to a drive system, a braking system, a steering system, and/or a transmission system of the vehicle, and transmit a control signal output from the remote parking controller 160 to the drive system, the braking system, the steering system, and/or the transmission system.

In addition, the communicator 140 may further include a communication module supporting a vehicle-to-everything (V2X) communication interface with the parking lot control system 200 and a communication module supporting a communication interface with the user terminal 300.

Here, the communication module includes a module for wireless internet connection or a module for short range communication. Wireless internet technology includes Wireless LAN (WLAN), Wireless Broadband (Wibro), Wi-Fi, and World Interoperability for Microwave Access (Wimax), and short range communication technology includes Bluetooth, ZigBee, Ultra Wideband (UWB), Radio Frequency Identification (RFID), and Infrared Data Association (IrDA).

The storage 150 may store data and/or algorithm required for the operation of the vehicle charging control apparatus 100.

For example, the storage 150 may store information on activation of an automatic moving and parking function of the vehicle. In addition, the storage 150 may store information on parking spaces, empty charging slots, or empty non-charging slots received from the parking lot control system 200. Moreover, the storage 150 may store commands and/or algorithms for controlling remote parking of the vehicle. Furthermore, the storage 150 may store commands and/or algorithms for controlling wireless parking of the vehicle.

Here, the storage 150 may include random access memory, (RAM), static random access memory (SRAM), read-only memory (ROM), programmable read-only memory (PROM), or electrically erasable programmable read-only memory (EEPROM).

The remote parking controller 160 may control the moving and parking of a driverless vehicle. Here, when the charging of the vehicle parked in a charging slot is completed, the remote parking controller 160 may control the vehicle to move and park in a non-charging slot, or when an empty charging slot is detected while the vehicle is waiting in a non-charging slot, the remote parking controller 160 may control the vehicle to move and park in the corresponding charging slot.

Here, the remote parking controller 160 may control the driving, braking, steering and/or shifting of the vehicle to control the moving and parking of the vehicle.

The remote parking controller 160 may include an external situation recognition module 161, a position recognition module 162, a route generation module 163, a parking space search module 164, a parking trajectory generation module 165, and a parking control module 166, that are implemented with software instruction, of which execution by the remote parking controller 160 performs functionalities of the external situation recognition module 161, the position recognition module 162, the route generation module 163, the parking space search module 164, the parking trajectory generation module 165, and the parking control module 166.

The external situation recognition module 161 may recognize the external situation of the vehicle while the vehicle is being controlled to move and park.

The position recognition module 162 may recognize the position of the vehicle and a destination to which the vehicle is to be moved.

The route generation module 163 may generate a traveling route from the position of the vehicle to the destination to apply the traveling route to the moving and parking of the vehicle when the position of the vehicle and the destination to which the vehicle is to be moved are recognized.

The parking space search module 164 may search for an empty parking space around the destination in the parking lot.

The parking trajectory generation module 165 may generate a parking trajectory of the vehicle for parking in a target parking space, for example, a target charging slot or a target non-charging slot.

The parking control module 166 may control the moving and parking of the vehicle on the basis of information output from the external situation recognition module 161, the position recognition module 162, the route generation module 163, the parking space search module 164 and/or the parking trajectory generation module 165. Here, the parking control module 166 may transmit control signals to the drive system, the braking system, the steering system, and/or the transmission system of the vehicle according to parking control situations.

Here, the remote parking controller 160 may execute a remote smart parking assist (RSPA) algorithm to control the vehicle to move and park.

The remote parking controller 160 may control the vehicle to move and park only when the automatic moving and parking function of the vehicle is activated on the basis of the signal received from the user terminal 300.

When the vehicle is parked in the charging slot, the charging controller 170 may control wireless charging of the vehicle parked in the charging slot. Here, the charging controller 170 may control the wireless charging of the vehicle by wireless power transmission with a wireless charger provided in the charging slot.

The vehicle charging control apparatus 100 according to this exemplary embodiment, which operates as described above, may be provided in the form of an independent hardware device including a memory and a processor for processing each operation, or may be included in another hardware device such as a microprocessor or a general purpose computer system. In addition, the controller 110, the remote parking controller 160, and/or the charging controller 170 in the vehicle charging control apparatus 100 according to this exemplary embodiment may be configured as at least one processor. Further, the parking lot control system 200 may be implemented at a central location, using terminals that are attached to a central computer or may be a computer installed at a parking lot wirelessly communicating with the user terminal 300 and the charging control apparatus 100

The sequence of operations between the vehicle charging control apparatus having the above-described configuration and the parking lot control system will be described in more detail below.

A vehicle including the vehicle charging control apparatus 100 may be a charging vehicle or a waiting vehicle. Thus, the sequence of operations between the vehicle charging control apparatus 100 and the parking lot control system 200 will be described by distinguishing between a method for controlling a vehicle which has been charged in a charging-slot to move and park in a non-charging slot according to a first exemplary embodiment, and a method for controlling a vehicle to move and park from a non-charging slot to a charging slot according to a second exemplary embodiment.

Figure 3:
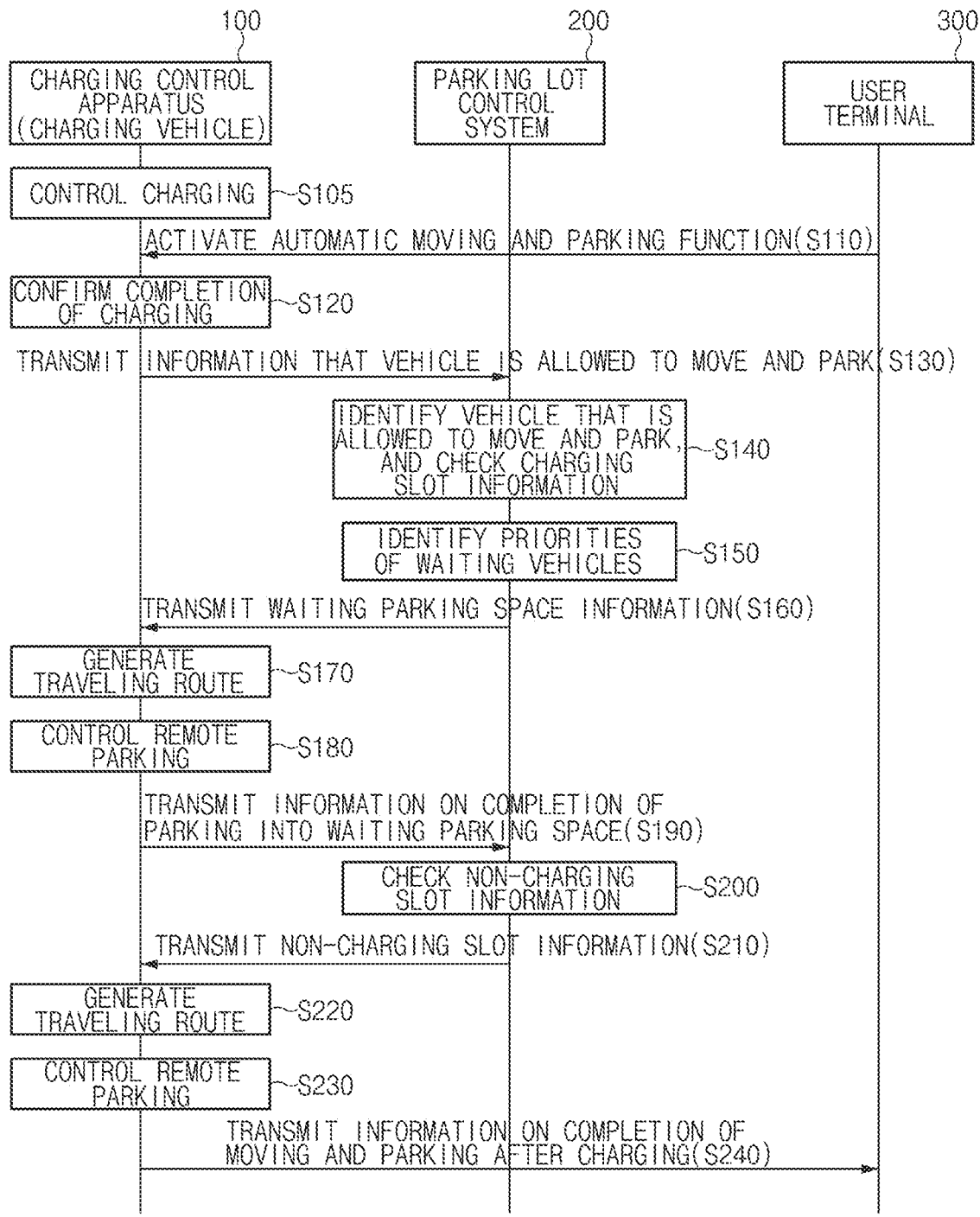
FIG. 3 illustrates a sequence of operations in a vehicle charging control method according to a first exemplary embodiment of the present disclosure.

FIG. 3 illustrates a sequence of operations in a vehicle charging control method according to a first exemplary embodiment of the present disclosure.

According to the first exemplary embodiment, the charging control apparatus 100 of the charging vehicle may control wireless charging of the vehicle parked in a charging slot in operation S105.

Here, when parked in the charging slot, the charging control apparatus 100 of the charging vehicle may activate an automatic moving and parking function of the vehicle on the basis of an activation signal received from the user terminal 300 in operation S110.

Next, when the charging of the vehicle is completed in operation S120, the charging control apparatus 100 of the charging vehicle may transmit information that the corresponding vehicle is allowed to move and park to the parking lot control system 200 in operation S130. Here, the parking lot control system 200 may identify the vehicle that is allowed to move and park on the basis of the information received in operation S130, and check information on the charging slot in which the corresponding vehicle is parked, in operation S140.

In addition, the parking lot control system 200 may identify the priorities of vehicles waiting in non-charging slots in order to determine the parking position of the vehicle which has been charged in operation S150, and transmit information on a waiting parking space around the position of a waiting vehicle having the highest priority to the charging control apparatus 100 of the charging vehicle in operation S160.

Then, the charging control apparatus 100 may generate a traveling route of the vehicle on the basis of the waiting parking space information received in operation S160, in operation S170, and control remote parking of the vehicle on the basis of the traveling route generated in operation S170, in operation S180.

When the parking of the vehicle into the waiting parking space is completed, the charging control apparatus 100 may transmit parking completion information to the parking lot control system 200 in operation S190.

When it is confirmed that the charged vehicle has been parked in the waiting parking space, the parking lot control system 200 may transmit information on an empty charging slot to the waiting vehicle having the highest priority to guide the corresponding vehicle to move and park into the empty charging slot. Then, when an empty non-charging slot appears due to the movement of the waiting vehicle, the parking lot control system 200 may check information on the non-charging slot in operation S200, and transmit the information to the charging control apparatus 100 in operation S210.

The charging control apparatus 100 may generate a traveling route on the basis of the non-charging slot information received in operation S210, in operation S220, and control remote parking of the vehicle on the basis of the traveling route generated in operation S220, in operation S230.

When the charged vehicle has been moved and parked in the non-charging slot after completion of charging, the charging control apparatus 100 may transmit information on completion of moving and parking to the user terminal 300 through the communicator in operation S240.

Therefore, the user at a remote location may check information on the state of charge of the vehicle and the position of the vehicle which has been moved and parked on the basis of the information on completion of moving and parking output to the user terminal 300.

Figure 4:
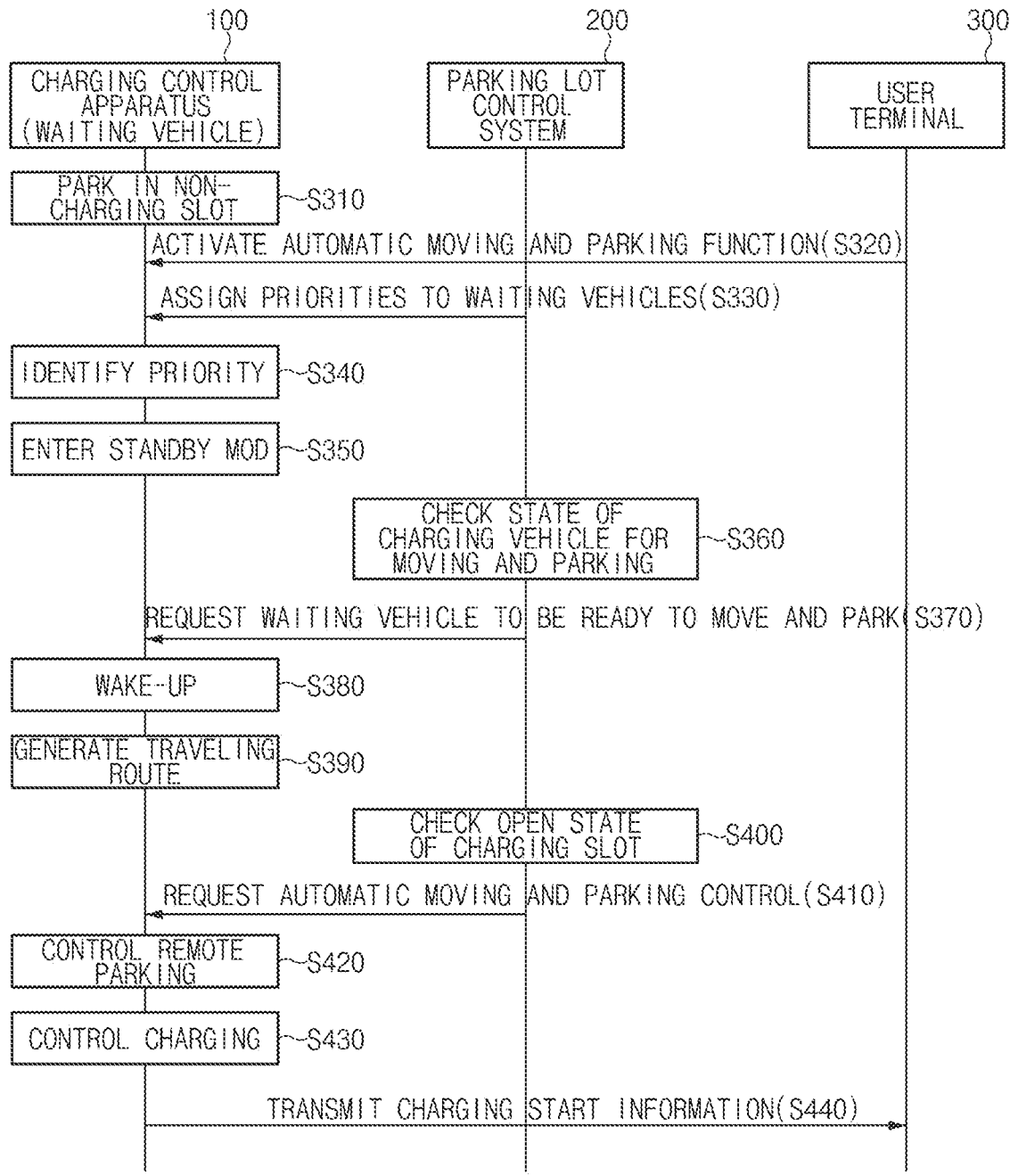
FIG. 4 illustrates a sequence of operations in a vehicle charging control method according to a second exemplary embodiment of the present disclosure.

FIG. 4 illustrates a sequence of operations in a vehicle charging control method according to a second exemplary embodiment of the present disclosure.

According to the second exemplary embodiment, in a state in which a waiting vehicle is parked in a non-charging slot in operation S310, the charging control apparatus 100 of the waiting vehicle may activate an automatic moving and parking function of the vehicle on the basis of an activation signal received from the user terminal 300 in operation S320.

Here, the parking lot control system 200 may assign priorities to waiting vehicles in order of entry into a parking lot in operation S330.

The charging control apparatus 100 of the waiting vehicle may identify the priority of the corresponding vehicle on the basis of the information received in operation S330, in operation S340, and enter a standby mode in operation S350.

When the charging control apparatus 100 of the waiting vehicle is in the standby mode, the parking lot control system 200 may check the state of a charging vehicle parked in a charging slot to determine whether the charging vehicle is allowed to move and park in operation S360. When it is confirmed that the charging vehicle is allowed to move and park, the parking lot control system 200 may transmit, to the charging control apparatus 100 of the waiting vehicle having the highest priority, a request signal for requesting the waiting vehicle to be ready to move and park in operation S370. In operation S370, the parking lot control system 200 may check information on the charging slot which is occupied by the charging vehicle that is allowed to move and park, and transmit the charging slot information along with the request signal.

Then, the charging control apparatus 100 of the waiting vehicle may wake up the waiting vehicle from the standby mode on the basis of the signal received in operation S370, in operation S380, and generate a traveling route from the current position of the waiting vehicle to the charging slot on the basis of the charging slot information in operation S390. Here, the charging control apparatus 100 of the waiting vehicle may wait until it is requested to control the waiting vehicle to move and park by the parking lot control system 200.

When it is confirmed that the charging slot is open due to the movement of the charging vehicle parked therein in operation S400, the parking lot control system 200 may transmit, to the charging control apparatus 100 of the waiting vehicle, a request signal for requesting the charging control apparatus 100 of the waiting vehicle to control moving and parking of the waiting vehicle in operation S410.

When receiving the request signal in operation S410, the charging control apparatus 100 of the waiting vehicle may control remote parking of the waiting vehicle on the basis of the traveling route generated in operation S390, in operation S420.

In addition, when the waiting vehicle has been parked in the charging slot, the charging control apparatus 100 of the waiting vehicle may control wireless charging of the vehicle in operation S430. Here, when the wireless charging is started, the charging control apparatus 100 may transmit charging start information to the user terminal 300 through the communicator in operation S440.

Therefore, the user at a remote location may check information on the state of charge of the vehicle on the basis of the charging start information output to the user terminal 300.

FIGS. 5A through 5E illustrate a sequence of operations in moving and parking a charging vehicle and a waiting vehicle, according to an exemplary embodiment of the present disclosure.

Figure 5A:
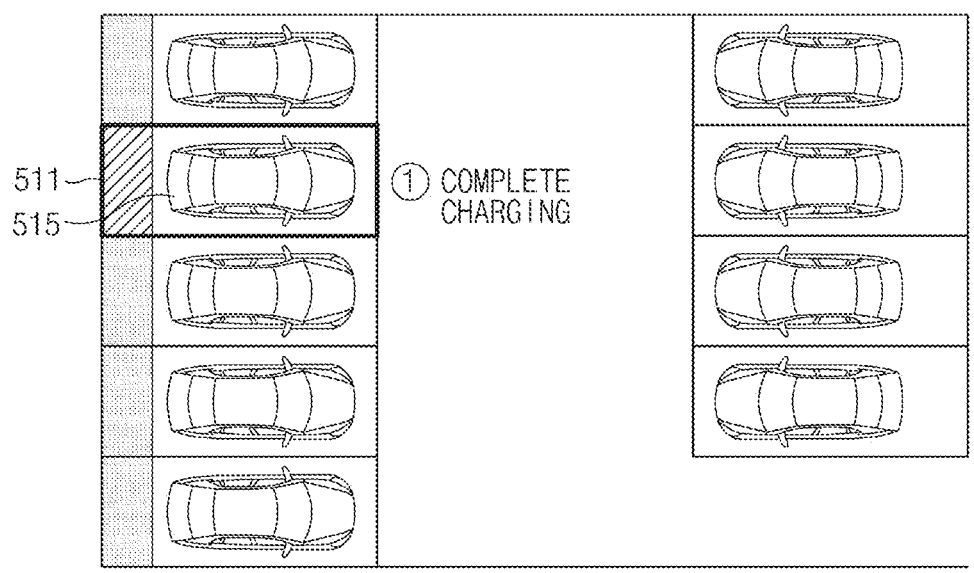
FIGS. 5A through 9B illustrate details of vehicle charging control operations, according to exemplary embodiments of the present disclosure.
Figure 5B:
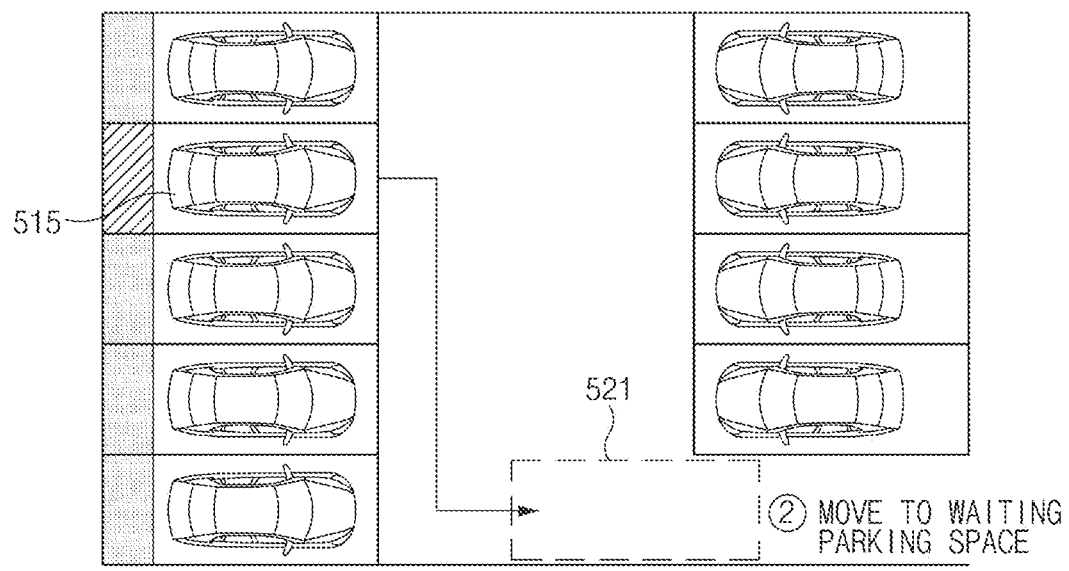

First, as illustrated in FIG. 5A, when the charging of a first vehicle 515 parked in a charging slot 511 is completed, the parking lot control system 200 may transmit, to the charging control apparatus 100 of the first vehicle 515, information on a waiting parking space around the parking position of a second vehicle having a high priority as illustrated in FIG. 5B. Thus, the charging control apparatus 100 of the first vehicle 515 may move the first vehicle 515 to park in a waiting parking space 521 on the basis of the information received from the parking lot control system 200.

Figure 5C:
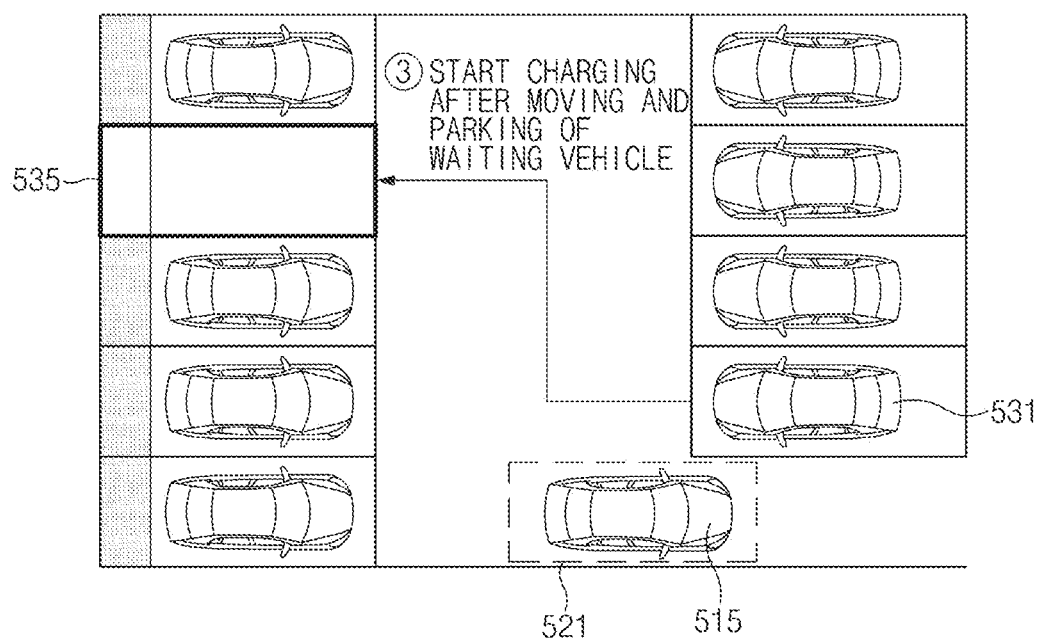

In addition, when the first vehicle 515 is moved and parked in the waiting parking space 521, the parking lot control system 200 may transmit information on an empty charging slot 535 to a second vehicle 531 that is waiting for charging as illustrated in FIG. 5C. Then, the charging control apparatus 100 of the second vehicle 531 may move the second vehicle 531 to park in the empty charging slot 535 on the basis of the information received from the parking lot control system 200. Here, when the second vehicle 531 has been parked in the charging slot 535, the charging control apparatus 100 of the second vehicle 531 may start wireless charging of the second vehicle 531.

Figure 5D:
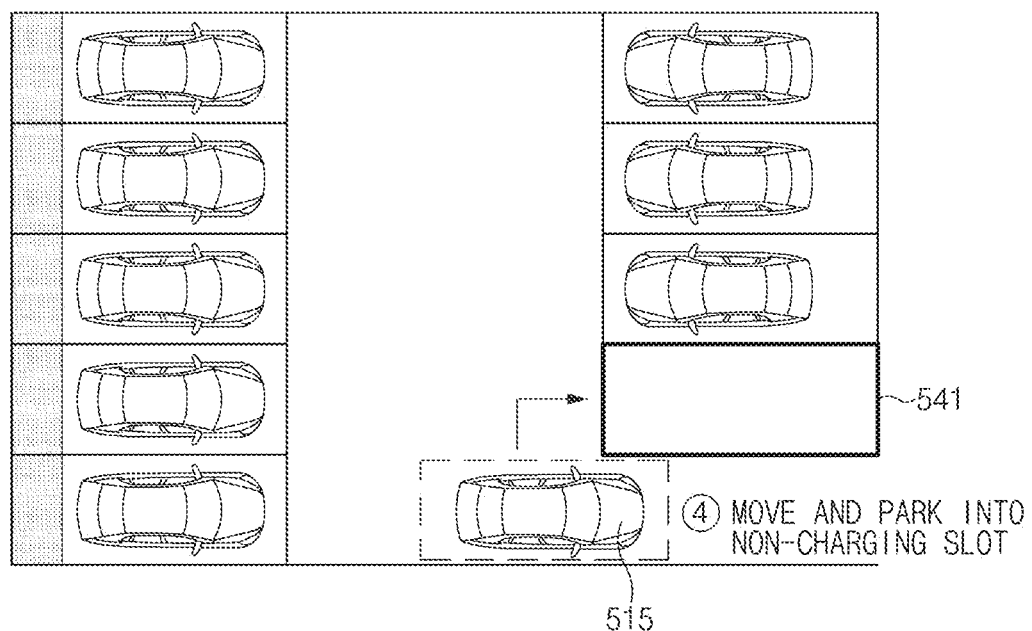
Figure 5E:
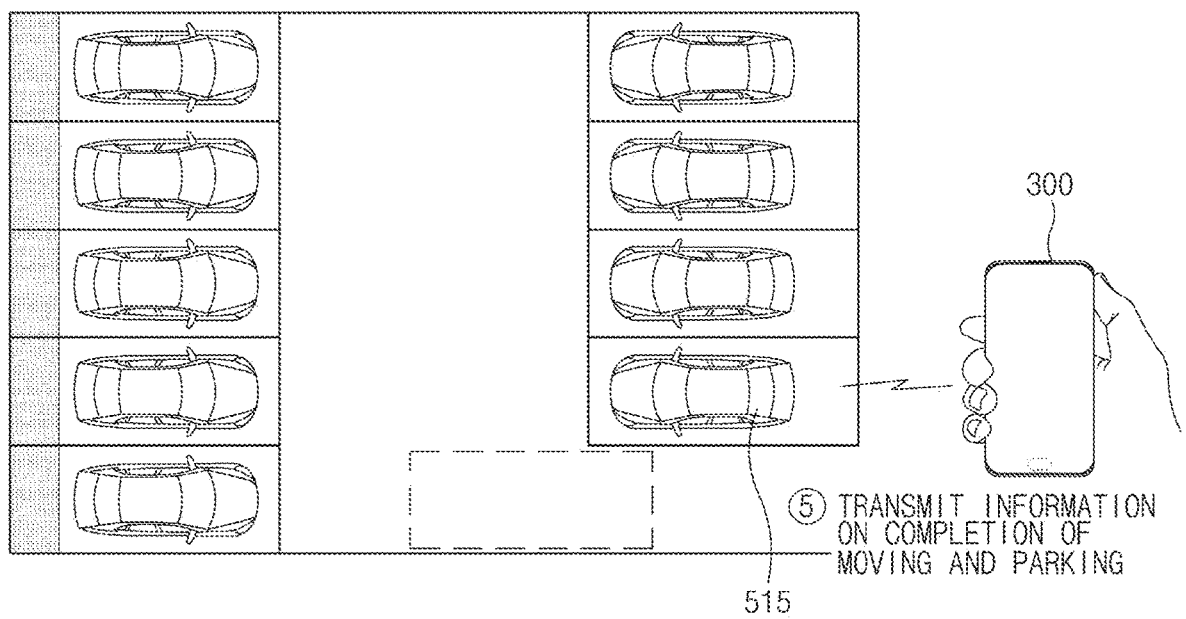

Thereafter, the parking lot control system 200 may transmit information on an empty non-charging slot 541 to the first vehicle 515 as illustrated in FIG. 5D, the charging control apparatus 100 of the first vehicle 515 may move the first vehicle 515 which has been charged to park in the empty non-charging slot 541. Here, the charging control apparatus 100 of the first vehicle 515 which has been moved and parked in the non-charging slot may transmit information on completion of moving and parking to the user terminal 300 through communications, as shown in FIG. 5E.

The user terminal 300 may output moving and parking guidance information on a display screen on the basis of the information on completion of moving and parking received from the charging control apparatus 100 of the first vehicle. Here, the moving and parking guidance information may be output on the display screen of the user terminal 300 as illustrated in FIG. 6.

Figure 6:
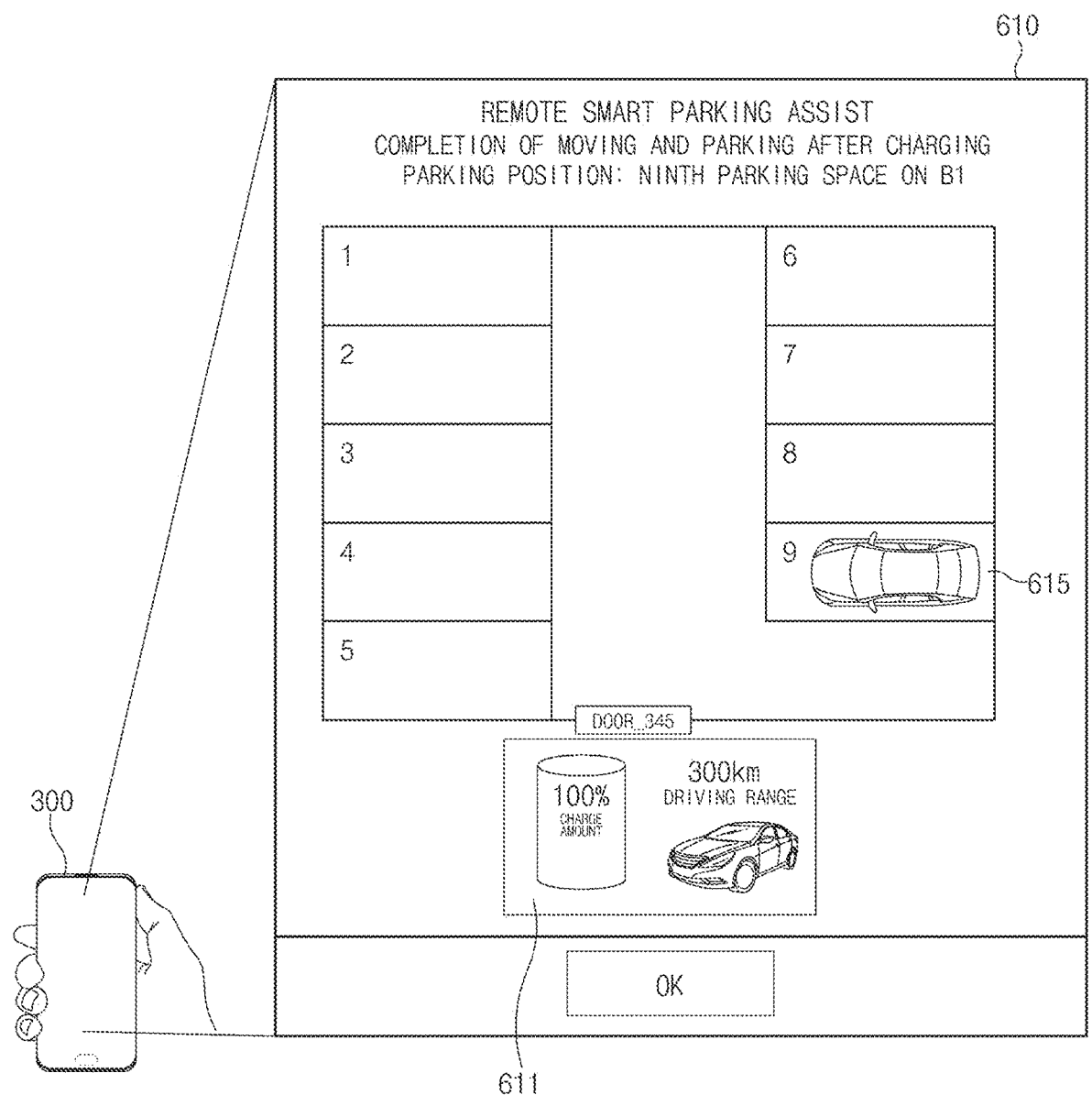

Referring to FIG. 6, a moving and parking guidance screen 610 may include information 611 on the state of charge of the vehicle, for example, information on charge amount and driving range (travelable distance). In addition, the moving and parking guidance screen 610 may include information on the position of a vehicle 615 that has been moved and parked.

Therefore, the user may be notified that the vehicle 615 has been parked in a ninth parking space of a first basement level (B1) on the basis of the vehicle position information on the moving and parking guidance screen 610 illustrated in FIG. 6.

Figure 7A:
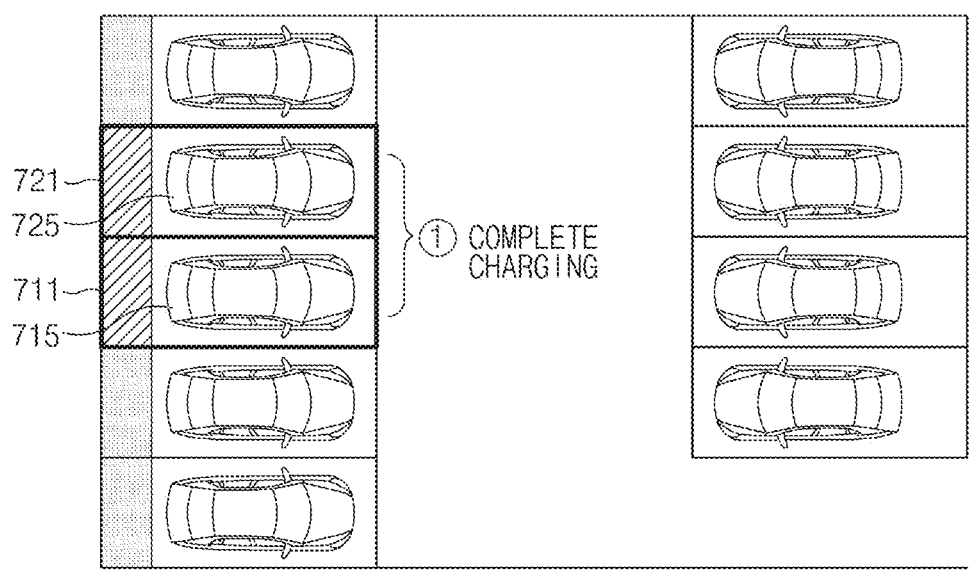
Figure 7B:
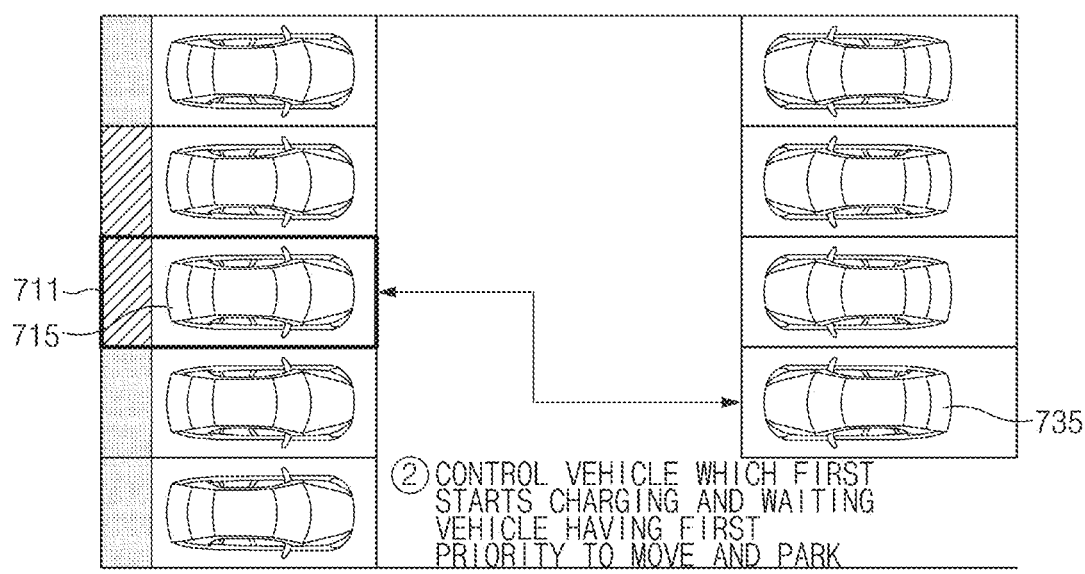
Figure 7C:
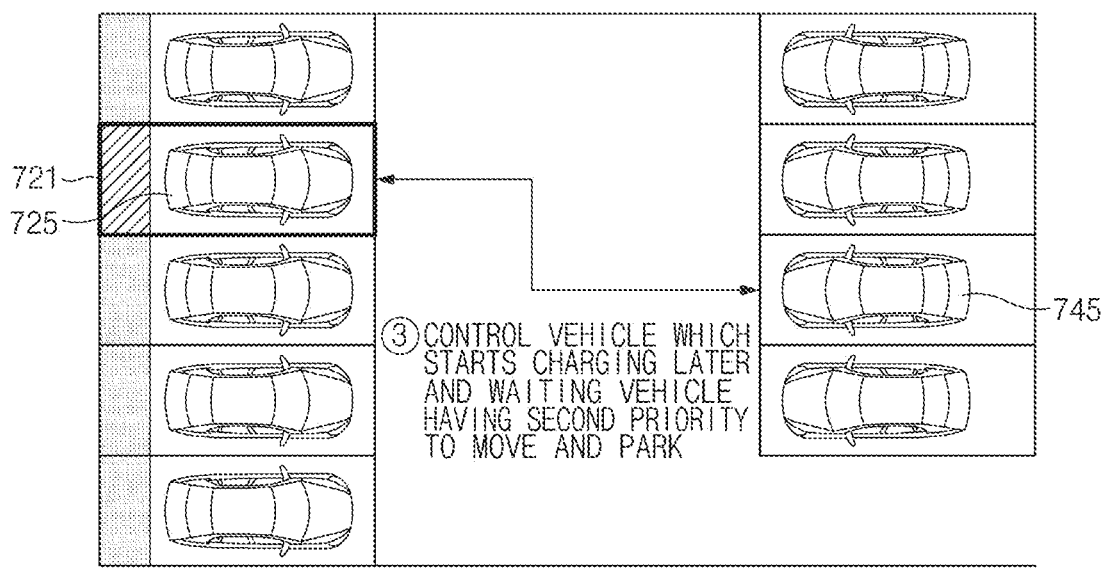

FIGS. 7A through 7C illustrate a sequence of operations in moving and parking a charging vehicle and a waiting vehicle when the charging of two vehicles is completed simultaneously, according to an exemplary embodiment of the present disclosure.

As illustrated in FIG. 7A, when a first vehicle 715 parked in a first charging slot 711 and a second vehicle 725 parked in a second charging slot 721 have been charged simultaneously, the parking lot control system 200 may check charging start time of the first vehicle 715 and the second vehicle 725.

As illustrated in FIG. 7B, the parking lot control system 200 may control the first vehicle 715 which first starts charging to move and park first. Here, the parking lot control system 200 may control the first vehicle 715 parked in the first charging slot 711 and a third vehicle 735 having the highest priority to move and park on the basis of the operations illustrated in FIGS. 5A through 5E.

Thereafter, as illustrated in FIG. 7C, the parking lot control system 200 may control the second vehicle 725 which starts charging later to move and park. Here, the parking lot control system 200 may control the second vehicle 725 parked in the second charging slot 721 and a fourth vehicle 745 having a next highest priority after the third vehicle to move and park on the basis of the operations illustrated in FIGS. 5A through 5E.

Figure 8A:
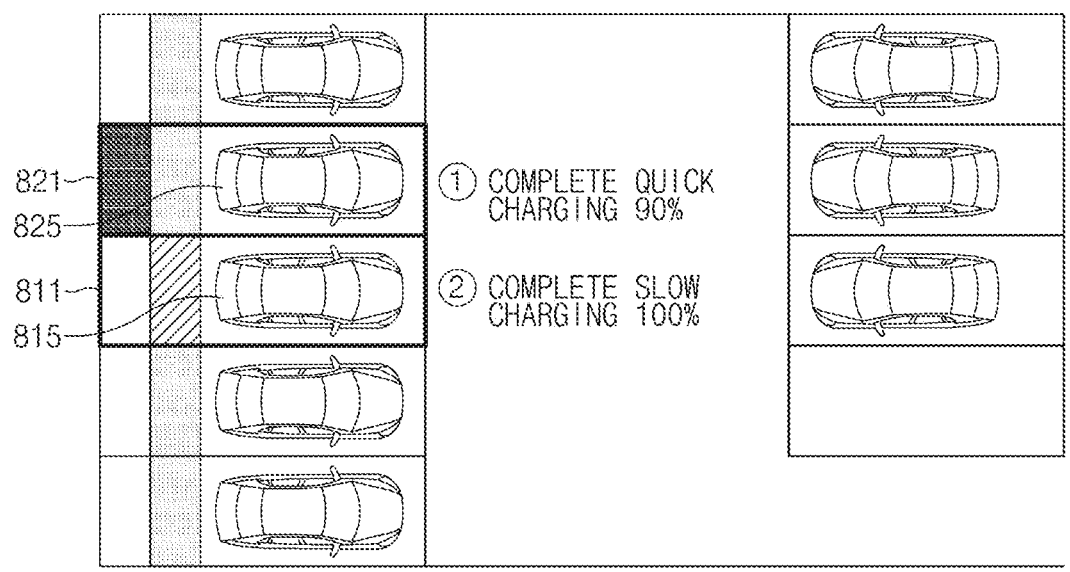
Figure 8B:
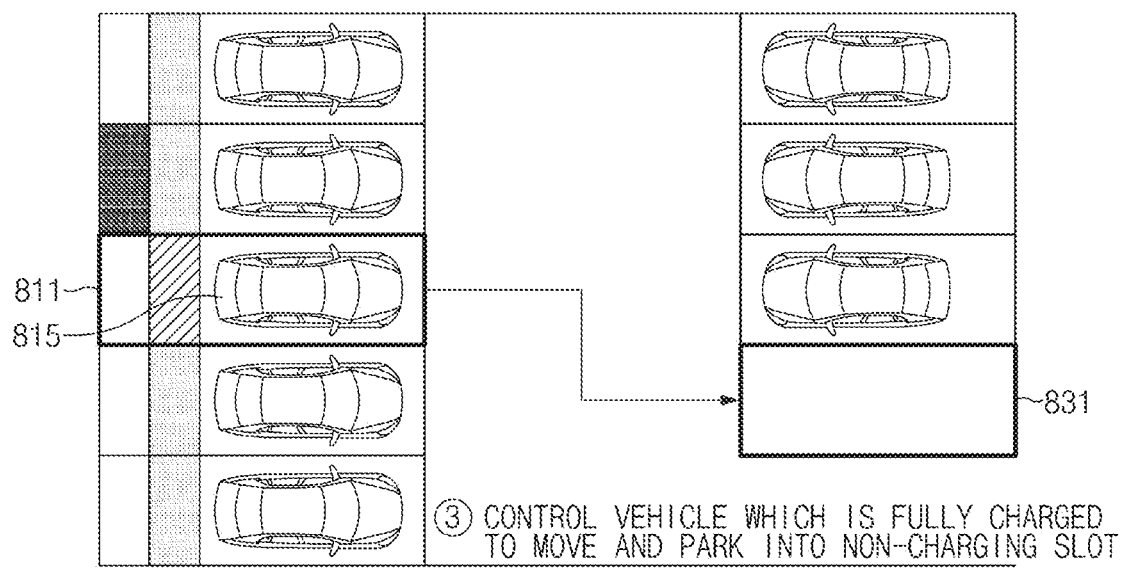
Figure 8C:
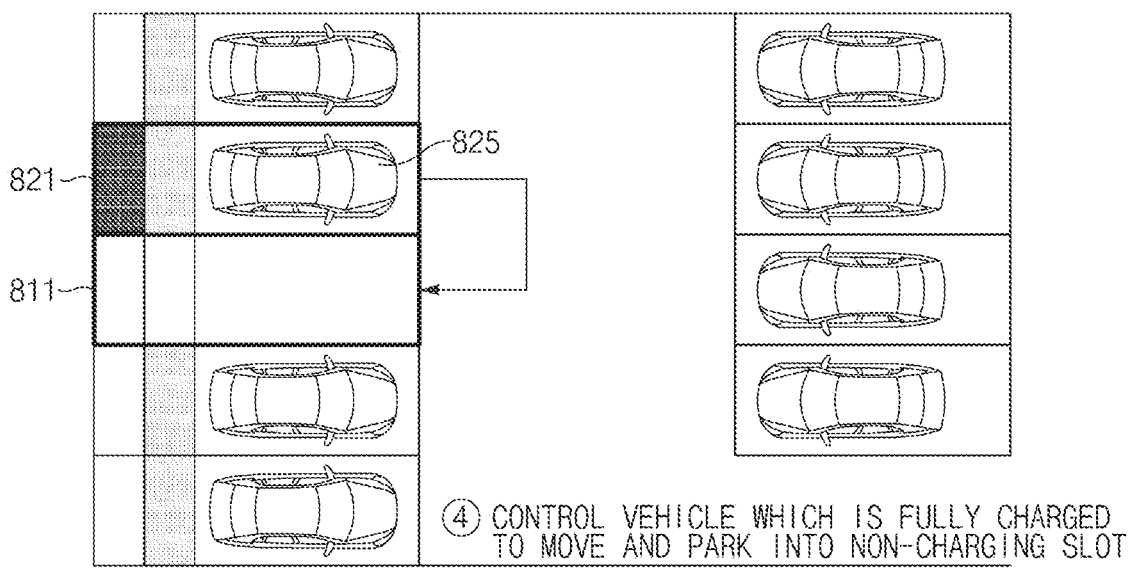

FIGS. 8A through 8C illustrate a sequence of operations in moving and parking a vehicle parked in a standard charging slot and a vehicle parked in a quick charging slot when the charging of the vehicles is completed simultaneously, according to an exemplary embodiment of the present disclosure.

As illustrated in FIG. 8A, when a first vehicle 815 parked in a standard charging slot 811 and a second vehicle 825 parked in a quick charging slot 821 have been charged simultaneously, the first vehicle 815 may be slowly charged to 100% and the second vehicle 825 may be quickly charged to about 90%.

Therefore, the parking lot control system 200 may control the first vehicle 815 which is fully charged to 100% to move and park first. Here, since there is an empty non-charging slot 831 as illustrated in FIG. 8B, the parking lot control system 200 may guide the first vehicle 815 into the empty non-charging slot 831, without providing information on waiting parking space.

If there is no empty non-charging slot, the parking lot control system 200 may control the first vehicle 815 and a waiting vehicle having the highest priority to move and park.

Since the second vehicle 825 parked in the quick charging slot 821 is not fully charged, the parking lot control system 200 may control the second vehicle 825 to move and park into the standard charging slot 811 which is open. Therefore, the charging control apparatus 100 of the second vehicle 825 may park the second vehicle 825 in the standard charging slot 811 and control wireless charging of the second vehicle 825, thereby allowing the second vehicle 825 to be slowly charged to 100%.

Although not shown, after the second vehicle 825 has been moved and parked in the standard charging slot 811, the parking lot control system 200 may control the waiting vehicle having the highest priority to move and park in a quick charging slot.

Figure 9A:
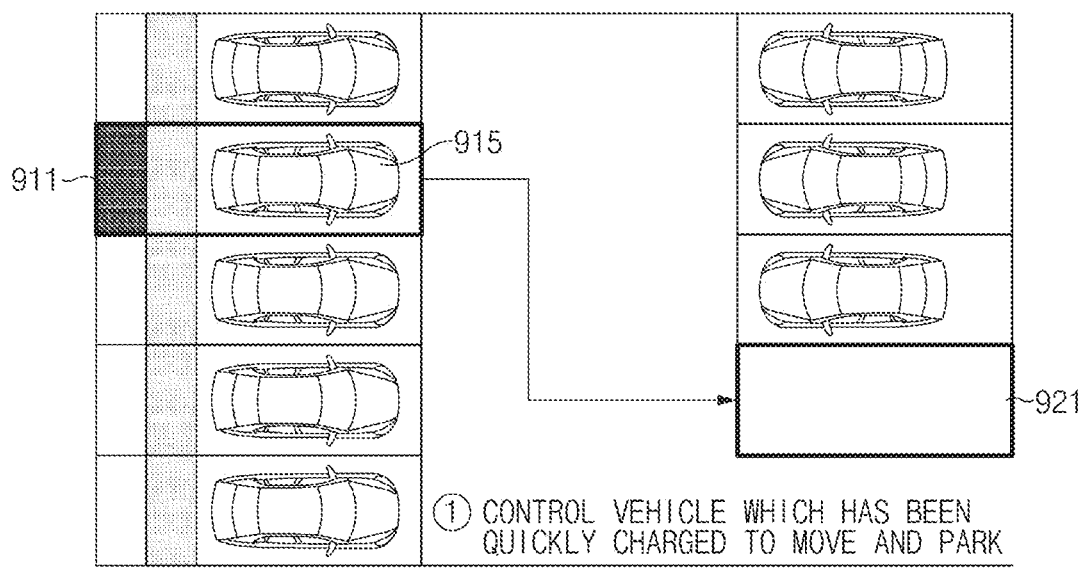
Figure 9B:
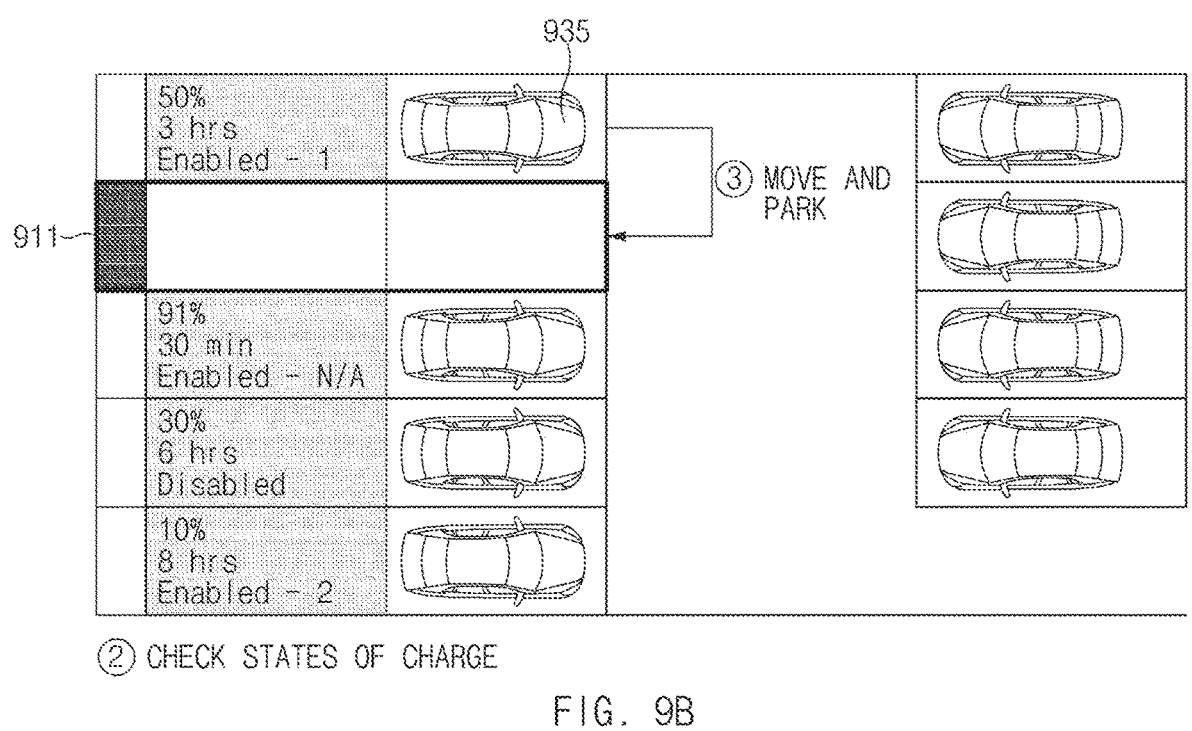

As illustrated in FIGS. 9A and 9B, the parking lot control system 200 may check the states of charge of vehicles which are being charged in standard charging slots, and allow any one of the vehicles to move and park in an empty quick charging slot according to the states of charge.

Referring to FIG. 9A, when quick charging of a first vehicle 915 parked in a quick charging slot 911 is completed, the parking lot control system 200 may transmit information on an empty non-charging slot 921 to the charging control apparatus 100 of the first vehicle 915. Here, the charging control apparatus 100 of the first vehicle 915 may move the first vehicle 915 to park in the empty non-charging slot 921 on the basis of the information received from the parking lot control system 200.

Thereafter, the parking lot control system 200 may check the states of charge of vehicles parked in standard charging slots. The parking lot control system 200 may determine which vehicle is to be moved and parked into a quick charging slot on the basis of priority of entry into the standard charging slots, charge amount, and/or remaining charging time, excepting cases where the charge amount of a vehicle is greater than or equal to a predetermined level (%) or the automatic moving and parking function of a vehicle is not activated.

Here, as illustrated in FIG. 9B, the parking lot control system may determine a third vehicle 935 having a charge amount of 50% and a remaining charging time of 3 hours as a target to be moved and parked, and control the third vehicle 935 to move and park into the quick charging slot 911.

Therefore, after the third vehicle 935 has been moved and parked in the quick charging slot 911, the charging control apparatus 100 of the third vehicle 935 may control quick charging of the third vehicle 935.

Although not shown, after the third vehicle 935 has been moved and parked in the quick charging slot 911, the parking lot control system 200 may control a waiting vehicle having the highest priority to move and park in an empty standard charging slot.

Figure 10:
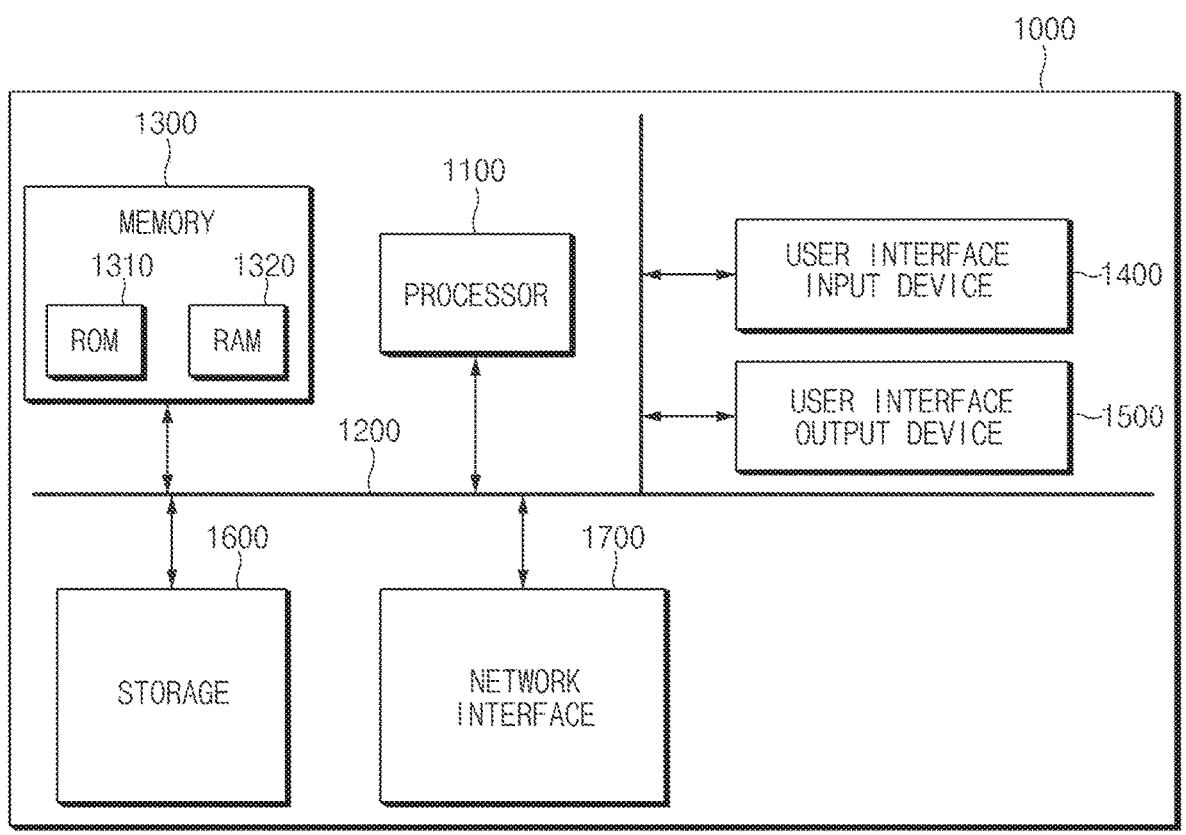
FIG. 10 illustrates the configuration of a computing system by which a method according to an exemplary embodiment of the present disclosure is executed.

FIG. 10 illustrates the configuration of a computing system by which a method according to an exemplary embodiment of the present disclosure is executed.

Referring to FIG. 10, a computing system 1000 may include at least one processor 1100, a bus 1200, a memory 1300, a user interface input device 1400, a user interface output device 1500, a storage 1600, and a network interface 1700, wherein these elements are connected through the bus 1200.

The processor 1100 may be a central processing unit (CPU) or a semiconductor device processing commands stored in the memory 1300 and/or the storage 1600. The memory 1300 and the storage 1600 include various types of volatile or non-volatile storage media. For example, the memory 1300 may include a read only memory (ROM) and a random access memory (RAM).

Therefore, the steps of the method or algorithm described in connection with the exemplary embodiments disclosed herein may be embodied directly in hardware, in a software module executed by the processor 1100, or in a combination thereof. The software module may reside in a storage medium (i.e., the memory 1300 and/or the storage 1600), such as RAM, a flash memory, ROM, an erasable programmable read-only memory (EPROM), an electrically erasable programmable read-only memory (EEPROM), a register, a hard disk, a removable disk, and a CD-ROM. An exemplary storage medium may be coupled to the processor 1100, such that the processor 1100 may read information from the storage medium and write information to the storage medium. Alternatively, the storage medium may be integrated with the processor 1100. The processor 1100 and the storage medium may reside in an application specific integrated circuit (ASIC). The ASIC may reside in a user terminal. Alternatively, the processor 1100 and the storage medium may reside as discrete components in a user terminal.

As set forth above, the present inventive concept can improve the efficiency of a charging infrastructure and increase the user's convenience by enabling automatic moving and parking of a vehicle by a remote smart parking assist (RSPA) system when the charging of the vehicle parked in a charging slot of a parking lot is completed or enabling automatic moving and parking of a vehicle by the RSPA system when an empty charging slot is detected while the vehicle is waiting in a non-charging slot of a parking lot.

In addition, by providing information on the state of charge or the moving and parking state of a vehicle parked in a charging slot or a non-charging slot of a parking lot through a remote user terminal, the user at a remote location can easily check the state of the vehicle.

Hereinabove, although the present disclosure has been described with reference to exemplary embodiments and the accompanying drawings, the present disclosure is not limited thereto, but may be various modified and altered by those skilled in the art to which the present disclosure pertains without departing from the spirit and scope of the present disclosure claimed in the following claims.

What is claimed is:

1. A vehicle charging control apparatus, comprising:
    a communicator transmitting and receiving a signal to and from a parking lot control system in a parking lot including charging slots and non-charging slots and a user terminal;
    a charging controller controlling wireless charging of a vehicle when the vehicle is parked in a charging slot of the parking lot; and
    a remote parking controller activating an automatic moving and parking function of the vehicle based on the signal received from the user terminal, receiving parking space information from the parking lot control system when the wireless charging of the vehicle is completed, and controlling the vehicle to move and park based on the parking space information.

2. The vehicle charging control apparatus according to claim 1, wherein the remote parking controller transmits information that the vehicle is allowed to move and park to the parking lot control system when the wireless charging of the vehicle is completed.

3. The vehicle charging control apparatus according to claim 1, wherein the remote parking controller is further configured to:
    recognize a location of the parking space;
    generate a traveling route to the parking space as a destination;
    generate a parking trajectory based on the parking space; and
    control parking of the vehicle based on the generated parking trajectory.

4. The vehicle charging control apparatus according to claim 1, wherein the parking space information includes information on a location of an empty non-charging slot.

5. The vehicle charging control apparatus according to claim 1, wherein the parking space information includes information on a location of a waiting parking space around a waiting vehicle having the highest priority.

6. The vehicle charging control apparatus according to claim 5, wherein the remote parking controller receives information on a location of an empty non-charging slot from the parking lot control system when the vehicle is parked in the waiting parking space, and controls the vehicle to move and park based on the received information on the location of the empty non-charging slot.

7. The vehicle charging control apparatus according to claim 1, wherein the remote parking controller transmits parking completion information to the user terminal when the vehicle moves to park.

8. A vehicle charging control method, comprising:
    controlling, by a charging controller, wireless charging of a vehicle when the vehicle is parked in a charging slot of a parking lot;
    activating, by a remote parking controller, an automatic moving and parking function of the vehicle based on a signal received from a user terminal; and
    receiving, by the remote parking controller, parking space information from a parking lot control system when the wireless charging of the vehicle is completed, and controlling the vehicle to move and park based on the parking space.

9. The vehicle charging control method according to claim 8, wherein the controlling of the vehicle comprises:
    receiving information on a location of a waiting parking space around a waiting vehicle having a highest priority from the parking lot control system;
    controlling the vehicle to move and park based on the information on the location of the waiting parking space; and
    controlling the vehicle to move and park based on information on a location of a non-charging slot received from the parking lot control system when the vehicle is parked in the waiting parking space.

10. The vehicle charging control method according to claim 9, further comprising transmitting parking completion information to the user terminal when the vehicle moves to park in the non-charging slot.

11. A vehicle charging system, comprising:
    a parking lot control system installed in a parking lot which includes charging slots and non-charging slots, the parking lot control system controlling a charging vehicle parked in a charging slot or a waiting vehicle parked in a non-charging slot to move and park;
    at least one vehicle charging control apparatus activating an automatic moving and parking function of the vehicle parked in the charging slot or the non-charging slot, controlling the vehicle to move and park based on charging slot information received from the parking lot control system when an empty charging slot is detected while the vehicle is in the non-charging slot of the parking lot, controlling wireless charging of the vehicle, and controlling the vehicle to move and park based on parking space information received from the parking lot control system when the wireless charging of the vehicle is completed; and
    a user terminal communicating with the charging control apparatus and providing information on a state of charge or a moving and parking state of the vehicle.

* * * * *